United States Patent [19]

Jeddeloh

[11] Patent Number: 5,953,743
[45] Date of Patent: *Sep. 14, 1999

[54] METHOD FOR ACCELERATING MEMORY BANDWIDTH

[75] Inventor: Joseph Jeddeloh, Minneapolis, Minn.

[73] Assignee: Micron Electronics, Inc., Nampa, Id.

[*] Notice: This patent is subject to a terminal disclaimer.

[21] Appl. No.: 08/928,557

[22] Filed: Sep. 12, 1997

Related U.S. Application Data

[62] Division of application No. 08/815,817, Mar. 12, 1997.

[51] Int. Cl.⁶ ..................................................... G06F 12/00
[52] U.S. Cl. ......................... 711/158; 711/154; 711/157; 365/230.01; 365/230.03
[58] Field of Search ..................................... 711/100, 154, 711/157, 158; 365/230.01, 230.03

[56] References Cited

U.S. PATENT DOCUMENTS

| | | | |
|---|---|---|---|
| 4,796,232 | 1/1989 | House | 365/189.03 |
| 4,958,351 | 9/1990 | Flora et al. | 371/40.15 |
| 5,432,922 | 7/1995 | Polyzois et al. | 395/182.04 |
| 5,432,923 | 7/1995 | Taniguchi et al. | 711/2 |
| 5,434,977 | 7/1995 | Landry et al. | 395/182.1 |
| 5,515,523 | 5/1996 | Kalkunte et al. | 711/149 |
| 5,713,011 | 1/1998 | Satoh et al. | 395/127 |

OTHER PUBLICATIONS

Intel, *Pentium Pro Family Developer's Manual*, vol. 1, Chapters 1 and 3, Jan. 1996.
Shanley, Tom and Don Anderson, MindShare, Inc., *ISA System Architecture*, Third Ed., Addison–Wesley Publishing, 1995, pp. 235–272.

*Primary Examiner*—John W. Cabeca
*Assistant Examiner*—Mehdi Namazi
*Attorney, Agent, or Firm*—Seed and Berry LLP

[57] ABSTRACT

A computer system and method process memory requests for access to a computer memory. The computer system arbitrates between current memory requests based on an immediately previous memory request that was most recently selected for transmission to the memory. The computer system minimizes the number of read/write delays by selecting one of the current memory requests based on the request types (read or write) of the current memory requests and the immediately previous memory requests. The number of RAS/CAS delays are reduced by selecting one of the current memory requests based on whether any of the rows to which the current memory requests are directed matches the row to which the immediately previous memory request was directed. The number of pre-charge delays is reduced by selecting one of the current memory requests based on whether any of the current memory requests is directed to a memory bank other than the memory bank to which the immediately previous memory request was directed.

20 Claims, 2 Drawing Sheets

METHOD FOR ACCELERATING MEMORY BANDWIDTH

This application is a division of Ser. No. 08/815,817 filed Mar. 12, 1997.

TECHNICAL FIELD

The present invention relates to computer memory access, and more particularly, to pipelined arbitration of memory requests from a plurality of memory requesters.

BACKGROUND OF THE INVENTION

A computer system relies on memory to store instructions and data that are processed by a computer system processor. Breathtaking advances have been made in both the storage capacity and speed of computer memory devices. However, the speed of memory devices has not been able to keep pace with the speed increases achieved with current microprocessors. As a result the speed of current computer systems is limited by the speed in which data and instructions can be accessed from the memory devices of the computer system.

In a typical computer system, the computer system processor communicates with the computer memory via a processor bus and a memory controller. The computer memory typically includes a dynamic random access memory (DRAM) module, such as a single in-line memory module (SIMM) or a dual in-line memory module (DIMM). The memory module typically includes one or more banks of memory chips connected in parallel such that each memory bank stores one word of data per memory address.

One reason for delay in typical memory modules is that each memory chip includes one or more data lines that handle both data being written into the memory chip and data being read from the memory chip. Likewise, the memory controller may include a data bus that handles data written to and read from each memory chip. Alternatively, the data bus of the memory chip may be coupled directly to a data bus portion of the processor bus. As a result, each time access to the memory switches from a read to a write or a write to a read, a data must go completely through the memory data bus and possibly the memory controller data bus before data can be sent through the busses in the opposite direction. The time it takes to wait for the memory bus and possibly the memory controller bus to switch from one direction to the opposite direction is known as bus turn-around time and typically is at least one clock cycle of delay.

In a typical DRAM memory, each memory chip contains an array of memory cells connected to each other by both horizontal (row) and vertical (column) lines. Each memory cell stores a single bit and is accessed by a memory address that includes a row address that indexes a row of the memory array and a column address that indexes a column of the memory array. Accordingly, each memory address points to the memory cell at the intersection of the row specified by the row address and the column specified by the column address.

In order to limit their size, each memory chip typically includes only enough address pins to specify either the row address or the column address but not both simultaneously. As a result, the typical memory controller accesses a memory location sequentially by first transmitting the row address and then transmitting the column address. Specifically, the memory address controller places the row address on the memory address bus, asserts a row address select (RAS) control signal, then places the column address on the memory address bus and asserts a column address select (CAS) control signal. To ensure proper timing, the memory controller delays briefly after asserting the RAS control signal and before asserting the CAS signal (RAS/CAS delay).

A technique known as "page mode" has been developed to eliminate the RAS/CAS delay when successive accesses to the same row of memory occur. Because the majority of program execution is sequential in nature, program execution very often proceeds along a row of memory. When in page mode, a row comparator in the memory controller compares the row address of the memory location currently being accessed with the row address for the next memory access. If the row addresses are the same (known as a "page hit"), then the row comparator causes the memory controller to continue asserting the RAS control signal at the end of the current bus cycle. Because the memory already has the correct row address, the new column address can be immediately transferred to the memory without requiring a RAS/CAS delay.

Another memory delay, known as pre-charge delay, typically occurs after each memory read. A memory read of a DRAM location is implemented by partially charging or discharging the memory cell and then completely recharging or discharging the memory cell. The precharge delay refers to the amount of time that it takes complete these charging and discharging cycles.

The number of pre-charge delays can be reduced by splitting a memory bank into two memory banks and interleaving the memory locations in the two banks. Interleaving refers to storing consecutive data words in alternate memory banks such as storing all even-addressed data words in the first memory bank and all odd-addressed data words in the second memory bank. When an interleaved memory architecture is employed to implement consecutive reads of consecutively addressed data words, the second data word can be read from the second memory bank while the first memory bank is being pre-charged after the first data word is read from the first memory bank. As a result, the pre-charge delay is hidden each time that a data word is accessed from a memory bank that is different from the memory bank from which the previous data word is accessed.

Although the procedures discussed above reduce the number of delays in accessing data from computer memory, delays still occur on a regular basis. In particular, read/write delays still occur when switching from a read to a write or vice versa, RAS/CAS delays still occur when switching between memory rows accessed, and pre-charge delays still occur for consecutive reads to the same memory bank. This situation is made worse when one or more memory requesters submit memory requests simultaneously in addition to the memory requests from the computer system processor. Prior art memory controllers simply employ a rotational priority scheme in which the particular memory requester enabled to submit a memory request is switched after each memory request. Such a rotational priority scheme reduces the chances of receiving consecutive read or write requests to the same memory row and increases the number of switches from reads to writes and the number of consecutive requests to the same memory bank, thereby increasing the number of memory access delays.

SUMMARY OF THE INVENTION

The present invention is directed to a method, system and memory controller for processing memory requests for access to a computer memory. A preferred embodiment of the present invention receives at a memory controller a plurality of current memory requests from one or more memory requesters. The preferred embodiment arbitrates between the current memory requests based on an immediately previous memory request that was most recently selected for transmission to the memory. The arbitrating step selects one of the current memory requests to be the next memory request to be transmitted to the computer memory after the immediately previous memory request.

By arbitrating between current memory requests based on the immediately previous memory request, the preferred embodiment minimizes the number of read/write, RAS/CAS, and pre-charge delays that occur in processing the memory requests. The preferred embodiment minimizes the number of read/write delays by selecting one of the current memory requests based on the request types (read or write) of the current memory requests and the immediately previous memory request. That is, the preferred embodiment selects consecutive reads or consecutive writes, if possible. The number of RAS/CAS delays are reduced by selecting one of the current memory requests based on whether any of the rows to which the current memory requests are directed matches the row to which the immediately previous memory request was directed. The number of pre-charge delays is reduced by selecting one of the current memory requests based on whether any of the current memory requests is directed to a memory bank other than the memory bank to which the immediately previous memory request was directed.

DETAILED DESCRIPTION OF THE INVENTION

Figure 1:
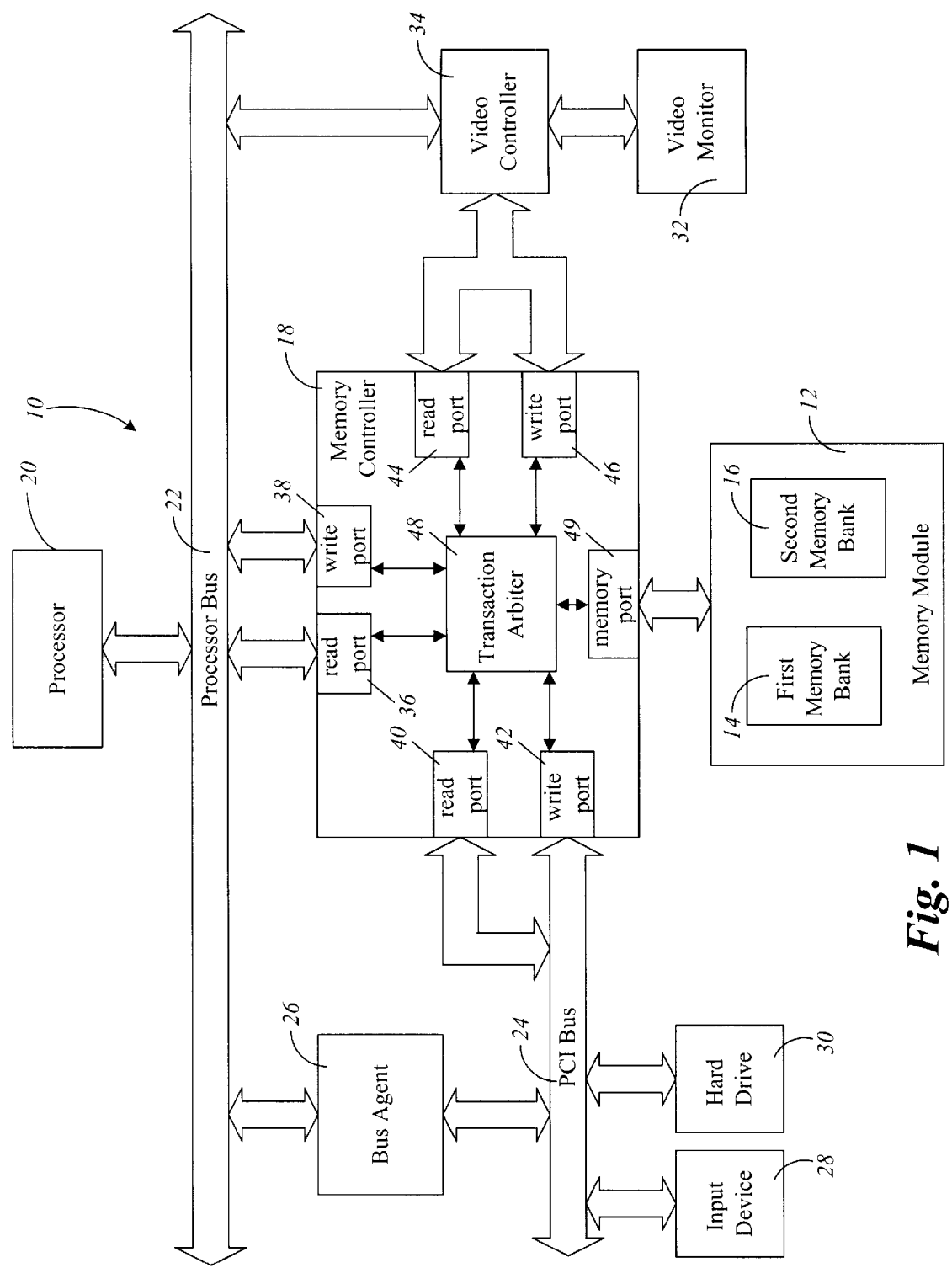
FIG. 1 is a block diagram of a computer system according to the present invention.

A computer system 10 for processing memory requests for access to a memory module 12 according to a preferred embodiment of the present invention is shown in FIG. 1. The memory module 12 can be any of numerous types of memory modules, such as a double in-line memory module (DIMM). The memory module 12 includes first and second memory banks 14, 16 that each include a set of DRAM memory chips structured to store data and computer instructions. Of course, the memory module 12 could have more or less than the two memory banks 14, 16 and could include memory other than DRAM, such as static random access memory (SRAM). In the preferred embodiment, the memory module 12, includes synchronous DRAM, but asynchronous DRAM also could be employed.

The computer system 10 includes a memory controller 18 that controls the manner in which data is written to or read from the memory banks 14–16 of the memory module 12. The memory controller 18 interfaces the memory module 12 with a computer system processor 20 via a processor bus 22. As is typical, the computer system 10 also includes an extension bus, such as a PCI bus 24, that is coupled to the processor bus 22 by a bus agent 26. Coupled to the extension bus 24 are an input device 28, such as a keyboard, mouse, or electronic pen/tablet, and a hard drive 30. The computer system 10 also includes a video monitor 32 coupled to the processor bus by a video controller 34 that controls the output of graphical and non-graphical information on the video monitor 32.

The processor 20, input device 28, hard drive 30 and video controller 34 each can be referred to as a memory requester because each can request access to the information stored in the memory module 12. In addition, the PCI bus 24 can also be referred to as a memory requester because the input device 28, hard drive 30, and any other devices coupled to the PCI bus 24 all require the PCI bus to transfer memory requests to the memory module 12. The PCI bus 24 and the video controller 34 preferably are coupled directly to the memory controller 18 to allow direct memory access to the memory module 12 by the PCI bus 24 and the video controller 34. Such direct memory access reduces the data that is carried on the processor bus 22, thereby reducing bottlenecks on the processor bus and increasing speed of communication between the elements of the computer system 10.

Unlike prior art memory controllers, the memory controller 18 preferably includes separate read and write ports for receiving read and write memory requests, respectively, from the memory requesters 20, 24, 34. In particular, the memory controller 18 includes processor read and write ports 36, 38 coupled to the processor 20 via the processor bus 22, PCI read and write ports 40, 42 coupled to the PCI bus 24, and video read and write ports 44, 46 coupled to the video controller 34. Each of the read ports 36, 40, 44 is responsive to respective read control signals received from their respective memory requesters. Similarly, each of the write ports 38, 42, 46 are responsive to write control signals received from their respective memory requesters 20, 24, 34.

The memory controller 18 also includes a transaction arbiter 48 that arbitrates between current memory requests for access to the memory module 12 received from one or more of the memory requesters 20, 24, 34. In contrast to prior art memory controllers, the transaction arbiter 48 arbitrates between the current memory requests based on an immediately previous memory request that was most recently selected for transmission to the memory module 12. As a result of the arbitration, the transaction arbiter 48 selects one of the current memory requests to be the next memory request to be transmitted via a memory port 49 to the memory module 12 after the immediately previous memory request. The transaction arbiter 48 can include a processor appropriately programmed with software instructions to perform the arbitration, but preferably a hardware embodiment is employed for increased speed.

Figure 2:
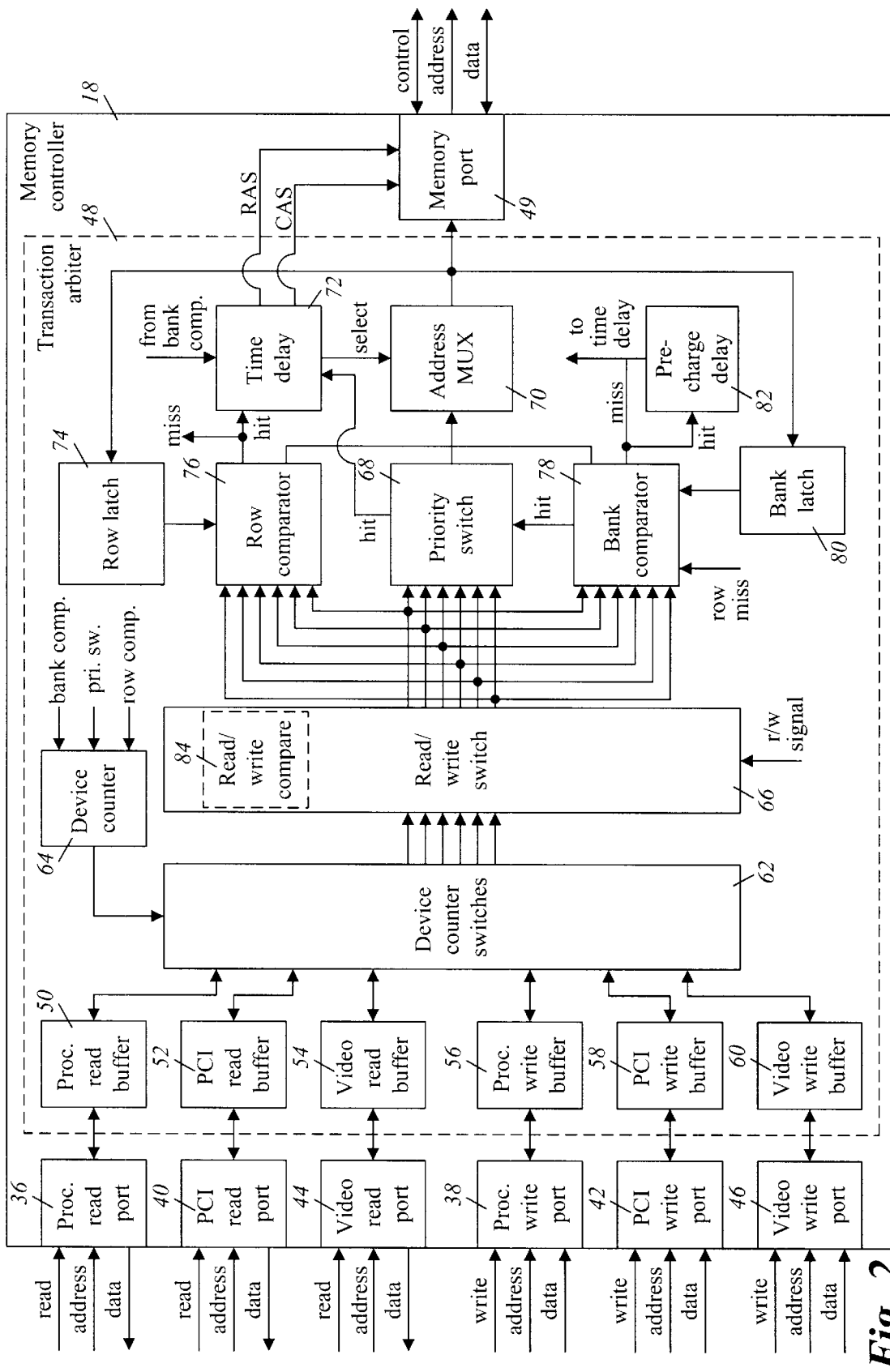
FIG. 2 is a block diagram of a memory controller of the computer system shown in FIG. 1.

A block diagram of the memory controller 18 is shown in FIG. 2. In the preferred embodiment shown in FIG. 2, the transaction arbiter 48 is a hardware design rather than a processor programmed with software instructions. The transaction arbiter 48 includes a processor read buffer 50, PCI read buffer 52, and video read buffer 54 coupled to the processor read port 36, PCI read port 40, and video read port 44, respectively. Similarly, the transaction arbiter 48 also includes a processor write buffer 56, PCI write buffer 58, and video write buffer 60 coupled to the processor write port 38, PCI write port 42, and video write port 46, respectively. Each of the buffers 50–60 stores one or more memory requests received from their respective ports 36–46. The memory requests received from the read ports 36, 40, 44 by the read buffers 50, 52, 54 each will include the memory address within the memory module 12 that is requested to be read. The memory requests received from the write ports 38, 42, 46 by the write buffers 56–60 each will include the data intended to be written and the address within the memory module 12 to which the data will be written.

The transaction arbiter 48 includes a device counter switch 62 that receives the current memory requests that are stored in the read and write buffers 50–60. The device counter switch 62 is responsive to a device counter 64 that counts the number of consecutive memory requests that have been transmitted to the memory module 12 from whichever of the memory requesters 20, 24, 34 that has transmitted the immediately previous memory request. Initially, the device counter switch 62 outputs each of the memory requests received from the read and write buffers 50–60. However, if the device counter 64 determines that the number of consecutive memory requests selected for the same memory requester has reached a predetermined or programmable threshold (e.g., five consecutive requests), then the device counter 64 causes the device counter switch 62 to open an internal switch that prevents the memory requests from the read and write buffers corresponding to the monopolizing memory requester from being output by the device counter switch. As a result, the device counter 64 and the device counter switch 62 prevent each of the memory requesters 20, 24, 34 from monopolizing access to the memory module 12 for an indefinite period.

The memory requests output from the device counter switch 62 are received by a read/write switch 66. The read/write switch 66 can be designed to initially allow any of the memory requests received from the device counter switch 62 to be output regardless of whether the memory request is a read or a write request. However, the read/write switch 66 subsequently will open internal switches that will prevent memory requests of opposite request type (read vs. write) from the immediately previous memory request from being output unless there are no other memory requests. For example, if the immediately previous memory request was a read request, then the read/write switch 66 will prevent any current write requests that are available to select.

A priority switch 68 receives the memory requests from the read/write switch 66 and outputs whichever memory requests it receives first to an address multiplexer (MUX) 70. In addition, the priority switch 68 transmits a hit signal to a time delay logic device 72 which responds by transmitting a select signal to the address MUX 70. The select signal from the time delay device 72 causes the address MUX 70 to output the row address to the memory module 12 through the memory port 49. Immediately after transmitting the select signal to the address MUX 70, the time delay device 72 transmits a row address strobe (RAS) signal via the memory port 49 to the memory controller 12. The RAS signal causes the memory module 12 to latch the row address received from the address MUX 70 in a row address latch (not shown) as is well known in the art. After delaying a predetermined time (RAS/CAS delay) to allow the memory module 12 to latch the row address received from the address MUX 70, the time delay device 72 transmits a second select signal to the address MUX 70 and transmits a column address strobe (CAS) signal to the memory module 12 via the memory port 49. The second select signal from the time delay device 72 causes the address MUX 70 to output the column address of the selected memory request to the memory module 12 via the memory port 49. In response to receiving the column address from the address MUX 70 and the CAS signal from the time delay device 72, the memory module performs the operation (read or write) requested by the selected memory access request.

As soon as the first memory request is selected, the priority switch 68 transmits to the device counter 64 a device indicator signal that indicates which memory requester originated the selected memory request. In response to the device identifier signal, the device counter 64 updates its device counter for the originating memory requester. Because the selected memory request is only the first memory request selected, the device counter 64 allows the device counter switch 62 to output whichever memory requests are currently stored in the read and write buffers 50–60.

Upon selecting the first memory request, the priority switch 68 also transmits to the read/write switch 66 a read/write signal that indicates whether the selected memory request is a read request or a write request. In response to the read/write signal received from the priority switch 68, the read/write switch 66 determines whether there are any current memory requests received from the device counter switch 62 that are of the same request type (read or write) as the previously selected memory request. If so, then the read/write switch 66 allows the matching memory requests to be output and prevents the non-matching memory requests from being output.

As discussed above, the technique known as "page mode" prevents the occurrence of the RAS/CAS delay if one of the current memory requests is directed to the same memory row as the immediately preceding memory request that is being transmitted to the memory module 12. In contrast to the prior art memory controllers, the preferred embodiment of the present invention selects one of the current memory requests output by the read/write switch 66 based on whether any of the current memory requests is directed to the same memory row as the immediately previous memory request. In order to implement such a memory request selection, the transaction arbiter 48 includes a row latch 74 that receives and temporarily stores the row address of the immediately previous memory request. In addition, the transaction arbiter 48 includes a row comparator 76 that receives the current memory requests output by the read/write switch and compares the row addresses to which the current memory requests are directed to the row address of the immediately previous memory request which is received from the row latch 74. If one or more of the current memory requests is directed to a row address that matches the row address of the immediately previous memory request, then the row comparator 76 identifies and outputs the first such memory request to the address MUX 70. In addition, the row comparator 76 transmits to the time delay device 72 a hit signal which causes the time delay device to transmit a select signal to the address MUX 70. Because the correct row address has not changed, the address MUX 70 outputs the column address of the newly selected memory request in response to the select signal from the time delay device 72. In addition, the time delay device 72 transmits the CAS signal to the memory module 12 without waiting for any RAS/CAS delay. In response to receiving the column address and the CAS signal, the memory module executes the selected memory request on the same row as the immediately previous memory request.

If none of the current memory requests are directed to the same row as the immediately previous memory request, then the memory module 12 must pre-charge the row to which the immediately previous memory request was directed before accessing another row of the same memory bank. However, bank interleaving can be employed to hide the pre-charge delay needed by the memory module 12 to implement such pre-charging. As discussed above, bank interleaving involves having consecutive memory locations on opposite memory banks of the memory module 12.

If the row comparator 76 determines that none of the current memory requests is directed to the same row as the immediately previous memory request, then the row comparator 76 outputs a miss signal without selecting one of the current memory requests. The miss signal from the row comparator 76 is directed to a bank comparator 78 which determines whether any of the current memory requests output by the read/write switch 66 is directed to a different one of the first and second memory banks 14, 16 than the memory bank to which the immediately previous memory request was directed. A bank latch 80 receives and temporarily stores an indication of the bank to which the immediately previous memory request was directed and transfers the bank indicator to the bank comparator 78. If the bank comparator 78 determines that one or more of the current memory requests is directed to a different bank than the bank to which the immediately previous memory request was directed, then the bank comparator selects and transmits the first such current memory request to the address multiplexer 70. In addition, the bank comparator 78 transmits a miss signal to the time delay device 72 which causes the address MUX 70 to transmit the selected current memory request to the memory module 12 via the memory port 49.

If the bank comparator determines that none of the current memory access requests is directed to a different one of the memory banks 14, 16, then the bank comparator 78 outputs a hit signal to the priority switch 68. In response to the hit signal received from the bank comparator 78, the priority switch selects the first current memory request that it received and outputs the selected current memory request to the address MUX 70. In addition, the bank comparator 78 also transmits the hit signal to a pre-charge delay device 82 which triggers the time delay device 72 after a delay sufficient to allow the memory module 12 to pre-charge the horizontal row to which the immediately previous memory request was directed.

As discussed above, the row comparator 76 and the bank comparator 78 each can select a current memory request based on the immediately previous memory request without regard for the priority in which the current memory requests were received by the memory controller 18. As a result, it would be possible for memory accesses to the same memory location to be performed out of order with potentially disastrous results. For example, suppose that the processor 20 issues a memory request to read the data stored in memory location 100 and then issues a second memory request to write new data to memory location 100. It is possible for the write request to be processed before the read request if both memory requests are processed immediately after a previous write request.

In order to prevent such read/write conflicts, the read/write switch 66 preferably includes a read/write compare device 84 that compares each current read request with each current write request. If the read/write compare device 84 determines that a read is directed to the same memory location as a previously received write request, then the read/write compare device 84 prevents the read/write switch 66 from outputting the read request until after the write request is selected. Similarly, if a write request is directed to the same memory location as a previously received read request, then the read/write compare device 84 prevents the read/write switch 66 from outputting the write request until after the read request has been selected.

Based on the foregoing discussion, it will be appreciated that the preferred embodiment of the present invention greatly reduces the number of memory access delays by arbitrating between current memory requests based on an immediately previous memory request. In particular, the preferred embodiment minimizes the number of read/write delays by selecting one of the current memory requests based on the request types (read or write) of the current memory requests and the immediately previous memory request. The number of RAS/CAS delays are reduced by selecting one of the current memory requests based on whether any of the rows to which the current memory requests are directed matches the row to which the immediately previous memory request was directed. The number of pre-charge delays is reduced by selecting one of the current memory requests based on whether any of the current memory requests is directed to a memory bank other than the memory bank to which the immediately previous memory request was directed. As a result, the preferred embodiment enables more memory requests to be processed within a given period of time and is possible with prior art devices.

It should be understood that even though numerous advantages of the present invention have been set forth in the foregoing description, the above disclosure is illustrative only. Changes may be made in detail and yet remain within the broad principles of the present invention.

I claim:

1. A computer-implemented method of processing memory requests for access to a computer memory that includes a logical array of memory addresses, the logical array including a plurality of rows and a plurality of columns, each of the memory requests being directed to one of the rows of the computer memory and having a request type that includes either a read or a write, the method comprising:

receiving at a memory controller a plurality of current memory requests;

arbitrating between the current memory requests based on a previous memory request that was most recently selected for transmission to the computer memory, the arbitrating step selecting one of the current memory requests based on whether any of the rows to which the current memory requests are directed matches the row to which the previous memory request was directed, the arbitration step further including selecting one of the current memory requests based on the request types of the current memory requests and the previous memory request, the selecting step including selecting a first one of the current memory requests if the first memory request has a request type that matches the request type of the previous memory request and the current memory requests other than the first current memory request have request types that do not match the request type of the previous memory request.

2. A computer-implemented method of processing memory requests for access to a computer memory that includes a logical array of memory addresses, the logical array including a plurality of rows and a plurality of columns, each of the memory requests being directed to one of the rows of the computer memory and each of the memory requests having a request type that includes either a read or a write, the method comprising:

receiving at a memory controller a plurality of current memory requests;

arbitrating between the current memory requests based on a previous memory request that was most recently selected for transmission to the computer memory, the arbitrating step selecting one of the current memory requests to be transmitted to the computer memory after the immediately previous memory request, the arbitration step comprising:

determining whether any of the current memory requests has a request type that matches the request type of the previous memory request;

if only a first one of the current memory requests has a request type that matches the request type of the previous memory request, then selecting the first current memory request to be the next memory request to be transmitted to the computer memory after the previous memory request; and if plural or none of the current memory requests have request types that match the request type of the immediately previous memory request, then selecting one of the current memory requests based on whether any of the rows to which the current memory requests are directed matches the row to which the previous memory request was directed; and transmitting the selected current memory request to the computer memory.

3. A computer-implemented method of processing memory requests for access to a computer memory that includes first and second memory banks having memory address blocks of one or more memory addresses, the memory address blocks arranged in an interleaving manner such that each memory address block of the first memory bank is followed logically by a memory address block of the second memory bank, the method comprising:

receiving at a memory controller a plurality of current memory requests;

arbitrating between the current memory requests based on a previous memory request to the first memory bank that was most recently selected for transmission to the computer memory, the arbitrating step selecting one of the current memory requests to be transmitted to the computer memory after the immediately previous memory request, and based on whether any of the current memory requests is directed to the second memory bank; and transmitting the selected current memory request to the computer memory.

4. A computer-implemented method of processing memory requests for access to a computer memory, including first and second memory banks having memory addresses arranged in an interleaving manner such that each memory address of the first memory bank is followed logically by a memory address of the second memory bank, the first and second memory banks being logically organized according to a logical array of memory addresses, the logical array including a plurality of rows and a plurality of columns, each of the memory requests being directed to one of the rows and one of the memory banks of the computer memory and each of the memory requests having a request type that includes either a read or a write, the method comprising:

receiving at a memory controller a plurality of current memory requests;

arbitrating between the current memory requests based on a previous memory request that was most recently selected for transmission to the computer memory, the arbitrating step selecting one of the current memory requests to be transmitted to the computer memory after the immediately previous memory request, the arbitration step further comprising:

determining whether any of the current memory requests has a request type that matches the request type of the previous memory request;

if only a first one of the current memory requests has a request type that matches the request type of the previous memory request, then selecting the first current memory request to be the next memory request to be transmitted to the computer memory after the previous memory request;

if plural or none of the current memory requests have request types that match the request type of the previous memory request, then determining whether any of the rows to which the current memory requests are directed matches the row to which the previous memory request was directed;

if one of the current memory requests is directed to a row that matches the row to which the previous memory request was directed, then selecting that current memory request; and if none of the current memory requests is directed to a row that matches the row to which the previous memory request was directed, then selecting one of the current memory requests based on whether any of the current memory requests is directed to a different memory bank than the memory bank to which the previous memory request was directed; and transmitting the selected current memory request to the computer memory.

5. A computer-implemented method of processing memory requests for access to a computer memory, the method comprising:

receiving at a memory controller first and second memory requests of the current memory requests from a first memory requester;

arbitrating between the first and second memory requests based on a previous memory request that was most recently selected for transmission to the computer memory, the arbitrating step selecting one of the first and second memory requests to be transmitted to the computer memory after the immediately previous memory request; and transmitting the selected current memory request to the computer memory.

6. A computer-implemented method of processing memory requests for access to a computer memory, the method comprising:

receiving at a memory controller a plurality of current memory requests; including memory requests from each of a plurality of memory requesters;

arbitrating between the current memory requests based on a previous memory request that was most recently selected for transmission to the computer memory, the arbitrating step selecting one of the current memory requests to be transmitted to the computer memory after the immediately previous memory request;

transmitting the selected current memory request to the computer memory;

counting how many consecutive memory requests are selected for transmission to the computer memory from an identified one of the memory requesters; and selecting one of the current memory requests from one of the memory requesters other than the identified memory requester if the number of consecutive memory requests selected for transmission to the computer memory from the identified memory requester exceeds a predetermined threshold.

7. A computer-implemented method of processing memory requests for access to a computer memory wherein each of the memory requests has a request type that includes either a read or a write, the method comprising:

receiving at a memory controller a plurality of memory requests;

selecting a first one of the memory requests for transmission to the computer memory;

arbitrating between the memory requests, other than the first memory request, based on the first memory request, the arbitrating step selecting a second one of the memory requests to be the next memory request to be transmitted to the computer memory after the first memory request, the arbitration step including selecting one of the memory requests based on the request types of the memory requests including the first memory request, the selecting step including selecting the second memory request if the second memory request has a request type that matches the request type of the first memory request and the memory requests other than the first and second memory requests have request types that do not match the request type of the first memory request; and transmitting the second memory request to the computer memory after transmitting the first memory request to the computer memory.

8. A computer-implemented method of processing memory requests for access to a computer memory, the computer memory including a logical array of memory addresses, the logical array including a plurality of rows and a plurality of columns, each of the memory requests being directed to one of the rows of the computer memory, the method comprising:

receiving at a memory controller a plurality of memory requests;

selecting a first one of the memory requests for transmission to the computer memory;

arbitrating between the memory requests, other than the first memory request, based on the first memory request, the arbitrating step selecting a second one of the memory requests to be the next memory request to be transmitted to the computer memory after the first memory request, the arbitrating step including selecting, as the second memory request, one of the memory requests based on whether any of the rows to which the memory requests are directed matches the row to which the first request was directed and transmitting the second memory request to the computer memory after transmitting the first memory request to the computer memory.

9. A computer-implemented method of processing memory requests for access to a computer memory that includes first and second memory banks having memory address blocks of one or more memory addresses, the memory address blocks arranged in an interleaving manner such that each memory address block of the first memory bank is followed logically by a memory address block of the second memory bank, the first memory request being directed to the first memory bank, the method comprising:

receiving at a memory controller a plurality of memory requests;

selecting a first one of the memory requests for transmission to the computer memory;

arbitrating between the memory requests other than the first memory request, based on the first memory request, the arbitrating step selecting a second one of the memory requests to be the next memory request to be transmitted to the computer memory after the first memory request, the arbitration step including selecting one of the memory requests based on whether any of the memory requests is directed to the second memory bank and;

transmitting the second memory request to the computer memory after transmitting the first memory request to the computer memory.

10. A computer-implemented method of processing memory requests from each of a plurality of memory requesters for access to a computer memory, the method comprising:

receiving at a memory controller a plurality of memory requests;

selecting a first one of the memory requests for transmission to the computer memory;

arbitrating between the memory requests, other than the first memory request, based on the first memory request, the arbitrating step selecting a second one of the memory requests to be the next memory request to be transmitted to the computer memory after the first memory request;

transmitting the second memory request to the computer memory after transmitting the first memory request to the computer memory;

counting how many consecutive memory requests are selected for transmission to the computer memory from an identified one of the memory requesters; and selecting, as the second memory request, one of the memory requests from one of the memory requesters other than the identified memory requester if the number of consecutive memory requests selected for transmission to the computer memory from the identified memory requester exceeds a predetermined threshold.

11. A computer-implemented method of processing memory requests from each of a plurality of memory requesters for access to a computer memory that includes a logical array of memory addresses, the logical array including a plurality of rows and a plurality of columns, the method comprising:

receiving at a memory controller a plurality of memory requests, each of the memory requests being directed to one of the rows of the computer memory and each of the memory requests having a request type that includes either a read or a write;

selecting a first one of the memory requests for transmission to the computer memory;

arbitrating between the memory requests, other than the first memory request, based on the first memory request, the arbitrating step selecting a second one of the memory requests to be the next memory request to be transmitted to the computer memory after the first memory request, the arbitrating step comprising:

determining whether any of the current memory requests has a request type that matches the request type of the previous memory request;

if only a first one of the current memory requests has a request type that matches the request type of the previous memory request, then selecting the first current memory request to be the next memory request to be transmitted to the computer memory after the previous memory request; and if plural or none of the current memory requests have request types that match the request type of the immediately previous memory request, then selecting one of the current memory requests based on whether any of the rows to which the current memory requests are directed matches the row to which the previous memory request was directed; and transmitting the second memory request to the computer memory after transmitting the first memory request to the computer memory.

12. A computer-implemented method of processing memory requests from each of a plurality of memory requesters for access to a computer memory that includes first and second memory banks having memory addresses arranged in an interleaving manner such that each memory address of the first memory bank is followed logically by a memory address of the second memory bank, the first and second memory banks being logically organized according to a logical array of memory addresses, the logical array including a plurality of rows and a plurality of columns, the method comprising:

receiving at a memory controller a plurality of memory requests, each of the memory requests being directed to one of the rows and one of the memory banks of the computer memory and each of the memory requests having a request type that includes either a read or a write;

selecting a first one of the memory requests for transmission to the computer memory;

arbitrating between the memory requests, other than the first memory request, based on the first memory request, the arbitrating step selecting a second one of the memory requests to be the next memory request to be transmitted to the computer memory after the first memory request, the arbitrating step comprising:

determining whether any of the current memory requests has a request type that matches the request type of the previous memory request;

if only a first one of the current memory requests has a request type that matches the request type of the previous memory request, then selecting the first current memory request to be the next memory request to be transmitted to the computer memory after the previous memory request;

if plural or none of the current memory requests have request types that match the request type of the previous memory request, then determining whether any of the rows to which the current memory requests are directed matches the row to which the previous memory request was directed;

if one of the current memory requests is directed to a row that matches the row to which the previous memory request was directed, then selecting that current memory request; and if none of the current memory requests is directed to a row that matches the row to which the previous memory request was directed, then selecting one of the current memory requests based on whether any of the current memory requests is directed to a different memory bank than the memory bank to which the previous memory request was directed; and transmitting the second memory request to the computer memory after transmitting the first memory request to the computer memory.

13. A computer-implemented method of processing memory requests from each of a plurality of memory requesters for access to a computer memory, the method comprising:

receiving at a memory controller first and second memory requests of the current memory requests from a first memory requester;

arbitrating between the first and second memory requests based on the previous memory request, the arbitrating step selecting one of the first and second memory requests to be the next memory request to be transmitted to the computer memory after the previous memory request; and transmitting the selected memory request to the computer memory after transmitting the previous memory request to the computer memory.

14. A computer-implemented method of processing memory requests for access to a computer memory, the method comprising:

receiving at a memory controller a plurality of current memory requests each of of which has a request type that includes either a read or a write;

arbitrating between the current memory requests based on another memory request that was received for transmission to the computer memory, the arbitrating step selecting one of the current memory requests to be transmitted to the computer memory in addition to the other memory request, the arbitrating step including selecting one of the current memory requests based on the request types of the current memory requests and the other memory request, the selecting step including selecting a first one of the current memory requests if the first memory request has a request type that matches the request type of the other memory request and the current memory requests other than the first current memory request have request types that do not match the request type of the other memory request; and transmitting the selected current memory request to the computer memory.

15. A computer-implemented method of processing memory requests for access to a computer memory that includes a logical array of memory addresses, the logical array including a plurality of rows and a plurality of columns, the method comprising:

receiving at a memory controller a plurality of current memory requests, each of the memory requests being directed to one of the rows of the computer memory;

arbitrating between the current memory requests based on another memory request that was received for transmission to the computer memory, the arbitrating step selecting one of the current memory requests to be transmitted to the computer memory in addition to the other memory request, the arbitration step including selecting one of the current memory requests based on whether any of the rows to which the current memory requests are directed matches the row to which the other memory request is directed; and transmitting the selected current memory request to the computer memory.

16. A computer-implemented method of processing memory requests for access to a computer memory that includes a logical array of memory addresses, the logical array including a plurality of rows and a plurality of columns, the method comprising:

receiving at a memory controller a plurality of current memory requests, each of the memory requests being directed to one of the rows of the computer memory and each of the memory requests having a request type that includes either a read or a write;

arbitrating between the current memory requests based on another memory request that was received for transmission to the computer memory, the arbitrating step selecting one of the current memory requests to be transmitted to the computer memory in addition to the other memory request, the arbitration step comprising:

determining whether any of the current memory requests has a request type that matches the request type of the other memory request;

if only a first one of the current memory requests has a request type that matches the request type of the other memory request, then selecting the first current memory request to be the next memory request to be transmitted to the computer memory; and if plural or none of the current memory requests have request types that match the request type of the other memory request, then selecting one of the current memory requests based on whether any of the rows to which the current memory requests are directed matches the row to which the other memory request is directed; and transmitting the selected current memory request to the computer memory.

17. A computer-implemented method of processing memory requests for access to a computer memory that includes first and second memory banks having memory address blocks of one or more memory addresses, the memory address blocks arranged in an interleaving manner such that each memory address block of the first memory bank is followed logically by a memory address block of the second memory bank, the method comprising:

receiving at a memory controller a plurality of current memory requests directed to the first memory bank;

arbitrating between the current memory requests based on another memory request that was received for transmission to the computer memory, the arbitrating step selecting one of the current memory requests based on whether any of the current memory requests is directed to the second memory bank; and transmitting the selected current memory request to the computer memory.

18. A computer-implemented method of processing memory requests for access to a computer memory that includes first and second memory banks having memory addresses arranged in an interleaving manner such that each memory address of the first memory bank is followed logically by a memory address of the second memory bank, the first and second memory banks being logically organized according to a logical array of memory addresses, the logical array including a plurality of rows and a plurality of columns, the method comprising:

receiving at a memory controller a plurality of current memory requests, each of the memory requests being directed to one of the rows and one of the memory banks of the computer memory and each of the memory requests having a request type that includes either a read or a write;

arbitrating between the current memory requests based on another memory request that was received for transmission to the computer memory, the arbitrating step selecting one of the current memory requests to be transmitted to the computer memory in addition to the other memory request, the arbitration step comprising:

determining whether any of the current memory requests has a request type that matches the request type of the other memory request;

if only a first one of the current memory requests has a request type that matches the request type of the other memory request, then selecting the first current memory request to be the next memory request to be transmitted to the computer memory;

if plural or none of the current memory requests have request types that match the request type of the other memory request, then determining whether any of the rows to which the current memory requests are directed matches the row to which the other memory request is directed;

if one of the current memory requests is directed to a row that matches the row to which the other memory request is directed, then selecting that current memory request; and if none of the current memory requests is directed to a row that matches the row to which the other memory request was directed, then selecting one of the current memory requests based on whether any of the current memory requests is directed to a different memory bank than the memory bank to which the other memory request is directed; and transmitting the selected current memory request to the computer memory.

19. A computer-implemented method of processing memory requests for access to a computer memory, the method comprising:

receiving at a memory controller first and second memory requests of the current memory requests from a first memory requester;

arbitrating between the first and second memory requests based on another memory request that was received for transmission to the computer memory, the arbitrating step selecting one of the first and second memory requests based on the other memory request; and transmitting the selected current memory request to the computer memory.

20. A computer-implemented method of processing memory requests for access to a computer memory, the method comprising:

receiving at a memory controller a plurality of current memory requests that include memory requests from each of a plurality of memory requesters;

arbitrating between the current memory requests based on another memory request that was received for transmission to the computer memory, the arbitrating step selecting one of the current memory requests to be transmitted to the computer memory in addition to the other memory request;

transmitting the selected current memory request to the computer memory;

counting how many consecutive memory requests are selected for transmission to the computer memory from an identified one of the memory requesters; and selecting one of the current memory requests from one of the memory requesters other than the identified memory requester if the number of consecutive memory requests selected for transmission to the computer memory from the identified memory requester exceeds a predetermined threshold.

* * * * *